JACOB & FREEMAN WISE.
Machine for Making Earthen and Stone Ware.
No. 9,437.                                Patented Nov. 30, 1852.
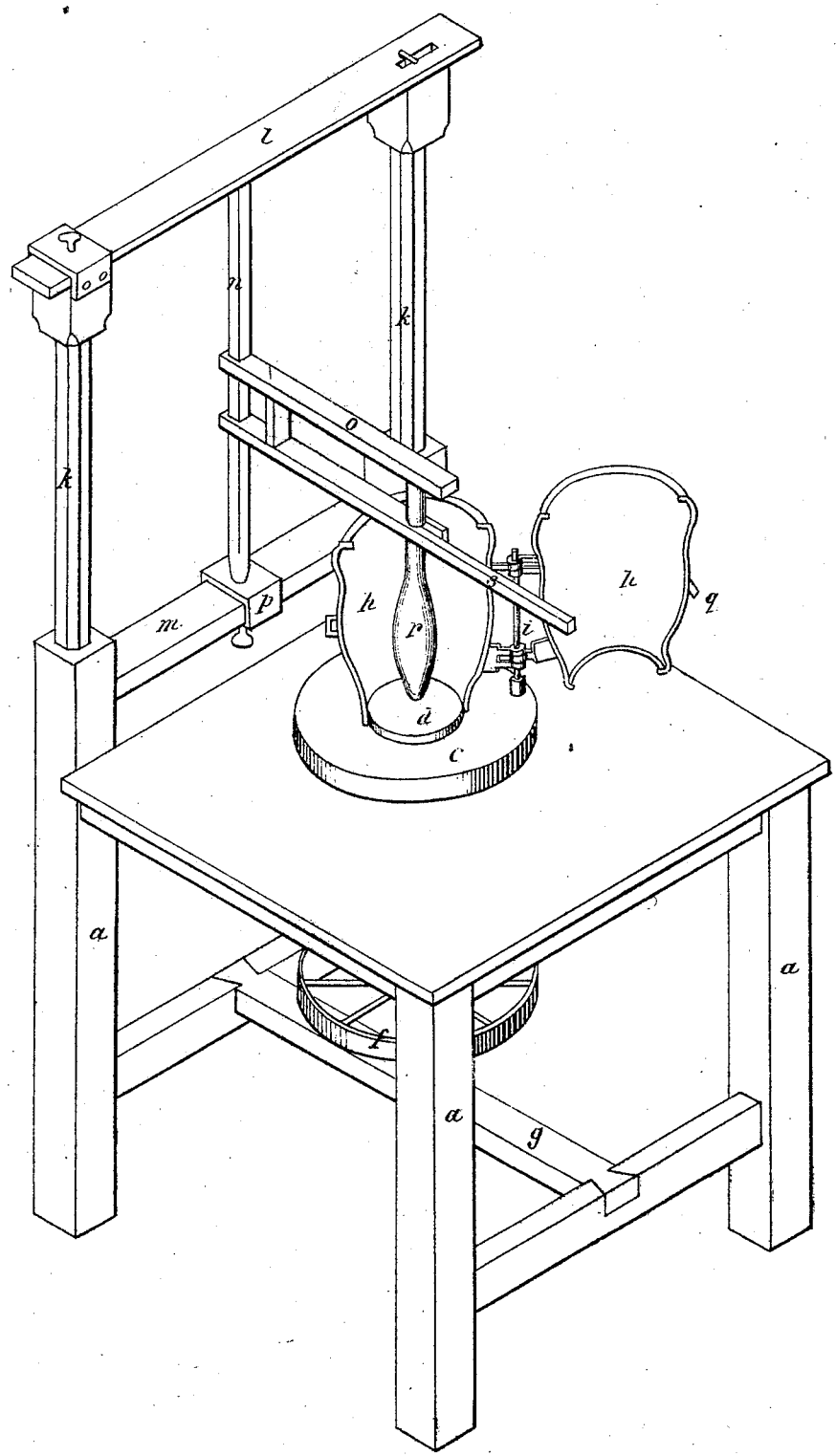

UNITED STATES PATENT OFFICE.

JACOB WISE AND FREEMAN WISE, OF FREDERICKTOWN, PENNSYLVANIA.

MANUFACTURE OF STONE AND EARTHEN WARE.

Specification of Letters Patent No. 9,437, dated November 30, 1852.

*To all whom it may concern:*

Be it known that we, JACOB WISE and FREEMAN WISE, of Fredericktown, in the county of Washington and State of Pennsylvania, have invented a new and useful Machine for Making Earthen or Stone Ware, being an Improved Potter's Wheel; and we do hereby declare that the following is a full, clear, and exact description of the construction and operation of the same, reference being had to the annexed drawings, making a part of this specification, which gives a perspective view of our machine, with one half of the mold thrown open.

Our invention consists in the application, to the usual head piece of a potter's wheel, of a rotary mold, which is movable at pleasure and revolves with the head piece; and also of a frame carrying a mandrel or plunger, which being inserted into the clay, inside of the mold, shapes the interior of the vessel to be made and presses the sides thereof into the mold as it is revolving on the wheels.

To enable those skilled in the art to make and use our invention, we will proceed to describe its construction and operation.

In the figure, $a$, $a$, represent the frame work of the wheel, differing from the ordinary construction of potter's wheels chiefly in the addition of the upright frame work marked $k$, $k$, &c.

$c$ is the head piece, made in the usual manner.

$d$ is the block of the head piece, or head block, which is a part peculiar to our machine. It is made of wood, about one fourth of an inch in thickness, and secured to the head piece by means of three or more screws, so as to be removable at pleasure, to suit the various molds. It is circular in shape and will vary in diameter, according to the size of the mold in use. The head piece is attached to the spindle or upright shaft and on the spindle is a pulley $f$, to which the power is applied by means of a strap from the steam engine or other motive power. The upper end of the spindle is a screw, which screws into the head piece, and by this means the head piece can be taken off, when necessary, for purposes hereafter described. The lower end of the spindle works in a socket on the cross tie $g$ (see the figure).

The mold (marked $h$ in the figure) in which the earthenware is made is constructed of iron or other suitable material. The interior of the mold is polished, and may be plain or figured, according to the article to be manufactured, and forms a matrix on which the pottery is shaped. The top of the mold is furnished with a collar, which by lessening the diameter of the mold at the top forms a resting place for the mandrel or plunger and regulates the thickness of the earthenware when finished. The mold has no bottom, the place of which is supplied by the head block $d$ (see figure), around which the lower edge of the mold fits accurately. This makes it necessary that the head block should be movable, as before stated, in order that it may be changed to correspond with the mold which it is desired to use. The mold is divided, longitudinally, into two equal parts, which are connected together by two hinges on one side and by a spring hasp or catch on the other ($q$) which keeps it tight when closed. The mold is attached to the head piece by an iron rod $i$ (see figure), which passes through the head piece, near its outer edge, and is secured by a screw nut underneath. The rod rising perpendicular to the head piece, passes through the hinges of the mold, forming the axis on which they turn. The mold may be removed from the head piece by simply lifting it up off the rod, when the two parts, having no longer any axis to their hinges, will separate. Another mold is attached to the head piece by putting it together and passing the rod through its hinges; but if the rod is higher than the top of the mold it will have to be unscrewed and a shorter one put in its place, otherwise it would interfere with the action of the mandrel, as hereafter described.

The mandrel frame is composed of two upright pieces $k$ $k$ (see figure) and two cross pieces, one above, marked $l$, and the other below, marked $m$; also the upright post $n$, which carries the mandrel lever $o$ (see figure). The post $n$ is either square or round and is so fixed as to turn around on its axis, and works in sockets, one of which is in the upper cross piece $l$, and the other in a slide marked $p$ (see figure) on the lower cross piece. The mandrel lever $o$, projects from the post $n$ (see figure) at right angles to it, and is attached to the post by means of two holes, through which the post passes, sufficiently loose to permit of the lever being readily slipped up and down the post, and yet tight enough to keep it steady. It is prevented from sliding too far down by a pin in the post n or by a collar and screw. The mandrel or plunger r is of wood or iron and depends from the lever, at right angles to it, and parallel with the post, so as to be immediately over the spindle, and consequently exactly in the center of the mold. From the end of the lever, beyond the mandrel or plunger, a handle, marked s, (see figure) projects, by which the lever is worked. The mandrel or plunger is made to revolve freely on its own axis (which is parallel to the axis of the mold) and is attached to the lever by being placed in a groove, and fastened with a pin, so as to be removable at pleasure. The mandrel is made slender, so as to sink easily into the clay, and will be either straight or curved, as may be required by the shape of the mold in use, the shape of the mandrel being similar to that of the interior of the piece of pottery to be made. The length of the mandrel will depend on the depth of the mold and the thickness of the bottom which it is designed to give to the article to be manufactured.

The upper cross piece l, is a separate piece from the rest of the machine, but is fixed on the top of the uprights k k (see figure) by means of a clamp with a screw to one side and to the other by a screw which passes through a longitudinal slit in the piece l. By means of this slit and the clamp screw this cross piece may be shifted along its length so as to throw the post n (figure) out of the perpendicular. This deviation from the perpendicular may be increased by moving the sliding socket p (see figure) on the lower cross piece m. The object of this obliquity will be hereinafter explained.

Having thus described the various parts of our machine we will proceed to show their operation and use.

The mold (marked u) being shut and the mandrel raised out of it, and the clay to be made into the pottery is placed in the mold. The mold being caused to be revolved the mandrel or plunger is lowered into the center of the mold and sunk into the clay. The action of the clay in the revolving mold against the sides of the mandrel causes it to revolve on its own axis. The mandrel or plunger being inserted into the clay perpendicularly, the lever is moved by hand sidewise, and pressed outward from the center of the mold. Thus the hole made in the clay by the mandrel is gradually enlarged until it is left the requisite size for the interior of the earthenware, and the clay is raised in the mold till it completely fills it, leaving the sides of the vessel of uniform thickness. The plunger is pushed out toward the circumference of the mold till it rests against the collar at the top, which serves as a gage for the thickness of the earthenware and prevents its being made too thin. The inside is made by the rolling of the mandrel perfectly smooth and even. It is necessary to use a small quantity of oil on the mold and on the mandrel in order to prevent the adhesion of the clay to their surfaces and to render the earthenware smooth. The mandrel is now brought back to the center and raised out of the mold and the mold thrown open, when the piece of earthenware will be left standing on the head block. All that is necessary now is to separate it from the head block in the usual manner. When the post is in a perpendicular position, the mandrel being so also, the sides of the article made in the mold will be as stated before, of uniform thickness, but if it is desired to make the lower part of the vessel thicker or thinner than the upper part it is to be effected by throwing the post n, by the means before described, out of the perpendicular. The mandrel being attached to the post will follow its inclination, and the same process being followed as before described the result will be similar, excepting that the thickness of the manufactured article will no longer be uniform above and below. If the mandrel is thus set obliquely, the upper or lower part of the article will be the thicker, according as the lever is pressed to one side or the other.

What we claim as our invention and desire to secure by Letters Patent is—

1. We claim the mode of attaching the mandrel so that it may revolve on its axis by means of friction with the clay and at the same time be moved from side to side within the mold.

2. The mode adopted for varying the relative thickness of the different parts of the manufactured article.

JACOB WISE.
FREEMAN WISE.

In presence of us:
 R. H. HAWKINS,
 WM. BAKEWELL.